United States Patent
Kim et al.

(10) Patent No.: US 11,520,519 B2
(45) Date of Patent: Dec. 6, 2022

(54) STORAGE DEVICE AND METHOD OF OPERATING THE SAME

(71) Applicant: SK hynix Inc., Icheon-si (KR)

(72) Inventors: Byung Jun Kim, Seoul (KR); Eu Joon Byun, Yongin-si (KR); Hye Mi Kang, Seongnam-si (KR)

(73) Assignee: SK hynix Inc., Icheon-si (KR)

( * ) Notice: Subject to any disclaimer, the term of this patent is extended or adjusted under 35 U.S.C. 154(b) by 469 days.

(21) Appl. No.: 16/513,470

(22) Filed: Jul. 16, 2019

(65) Prior Publication Data

US 2020/0192599 A1    Jun. 18, 2020

(30) Foreign Application Priority Data

Dec. 12, 2018    (KR) .................. 10-2018-0160246

(51) Int. Cl.
*G06F 3/06*    (2006.01)
(52) U.S. Cl.
CPC .......... *G06F 3/0656* (2013.01); *G06F 3/0604* (2013.01); *G06F 3/0652* (2013.01); *G06F 3/0679* (2013.01)
(58) Field of Classification Search
CPC ..... G06F 3/0604; G06F 3/0652; G06F 3/0656
See application file for complete search history.

(56) References Cited

U.S. PATENT DOCUMENTS

| | | | | |
|---|---|---|---|---|
| 8,725,951 | B2 * | 5/2014 | Busch | G06F 3/0613 |
| | | | | 711/133 |
| 9,665,442 | B2 * | 5/2017 | Koren | G06F 3/0649 |
| 2015/0220439 | A1 * | 8/2015 | Mickens | G06F 11/1469 |
| | | | | 711/135 |
| 2018/0060232 | A1 * | 3/2018 | Oshinsky | G06F 12/0868 |
| 2018/0150220 | A1 * | 5/2018 | Pandian | G06F 3/0659 |
| 2019/0004715 | A1 * | 1/2019 | Trika | G06F 12/0246 |
| 2019/0042140 | A1 * | 2/2019 | Natarajan | G06F 3/0656 |
| 2019/0324687 | A1 * | 10/2019 | Bassov | G06F 12/0804 |

FOREIGN PATENT DOCUMENTS

| | | |
|---|---|---|
| KR | 10-2017-0118288 | 10/2017 |
| KR | 10-2018-0046405 | 5/2018 |
| KR | 10-2019-0113430 | 10/2019 |

* cited by examiner

*Primary Examiner* — S. Sough
*Assistant Examiner* — Stephen D Berman
(74) *Attorney, Agent, or Firm* — Perkins Coie LLP

(57) ABSTRACT

Provided herein may be a storage device and a method of operating the same. A memory controller may include a command processor configured to generate a flush command in response to a flush request and determine flush data chunks to be stored, a write operation controller configured to control memory devices to perform a first program operation of storing flush data chunks, and to perform a second program operation of storing data corresponding to a write request that is input later than the flush request, regardless of whether a response to the flush command has been provided to a host, and a flush response controller configured to, when the first program operation is completed, provide a response to the flush command to the host depending on whether responses to flush commands, input earlier than the flush command, have been provided to the host.

18 Claims, 8 Drawing Sheets

FIG. 4

COMMAND INFORMATION STORAGE

| Input Seq | Request | CMD | Write Data # | Flush Data Chunk # |
|---|---|---|---|---|
| 1 | Write Request 1 | Write CMD 1 | Write Data 1 | |
| 2 | Write Request 2 | Write CMD 2 | Write Data 2 | |
| 3 | Flush Request 1 | Flush CMD 1 | | 1, 2, 3, 4, 5, 6 |
| 4 | Write Request 3 | Write CMD 3 | Write Data 3 | |
| 5 | Flush Request 2 | Flush CMD 2 | | 1, 2 |

FIG. 5

FLUSH INFORMATION STORAGE

| Flush CMD # | Status |
|---|---|
| Flush CMD 1 | Incomplete |
| Flush CMD 2 | Complete |

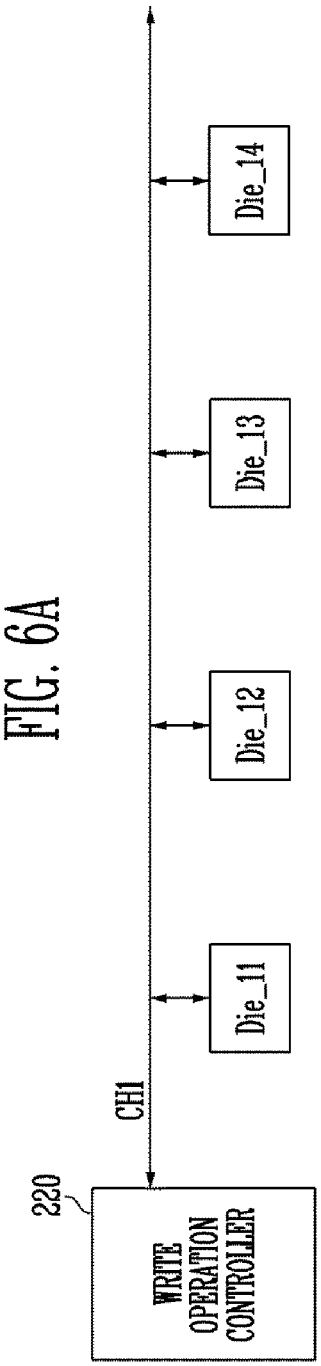

| Die_11 | | |
|---|---|---|
| Flush CMD # | Flush Data Chunk # | Status |
| Flush CMD 1 | Flush Data Chunk 1 | Complete |
| Flush CMD 1 | Flush Data Chunk 5 | Incomplete |

| Die_12 | | |
|---|---|---|
| Flush CMD # | Flush Data Chunk # | Status |
| Flush CMD 1 | Flush Data Chunk 2 | Complete |
| Flush CMD 1 | Flush Data Chunk 6 | Incomplete |

| Die_13 | | |
|---|---|---|
| Flush CMD # | Flush Data Chunk # | Status |
| Flush CMD 1 | Flush Data Chunk 3 | Complete |
| Flush CMD 2 | Flush Data Chunk 1 | Complete |

| Die_14 | | |
|---|---|---|
| Flush CMD # | Flush Data Chunk # | Status |
| Flush CMD 1 | Flush Data Chunk 4 | Complete |
| Flush CMD 2 | Flush Data Chunk 2 | Complete |

Flush CMD1 – Write operation for Flush Data Chunks (1,2,3,4) is complete
            Write operation for Flush Data Chunks (5,6) is incomplete
Flush CMD2 – Write operation for all Flush Data Chunks (1,2) is complete

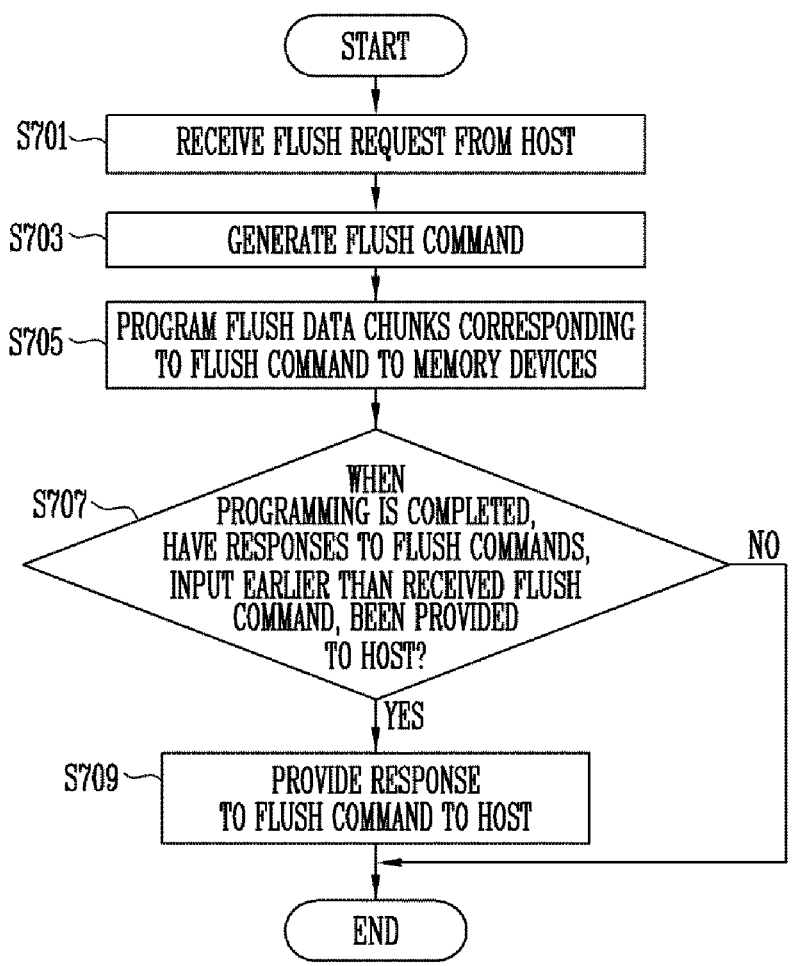

STORAGE DEVICE AND METHOD OF OPERATING THE SAME

CROSS-REFERENCE TO RELATED APPLICATION

This patent document claims priority to the Korean patent application number 10-2018-0160246 filed on Dec. 12, 2018, which is incorporated herein by reference in its entirety for all purposes.

TECHNICAL FIELD

Various embodiments of the disclosure generally relate to an electronic device, and more particularly, to a storage device and a method of operating the storage device.

BACKGROUND

A storage device is a device that can store data in a storage medium. Computing devices such as a personal computer or a smartphone can use such storage devices to retain data files. The storage device may include a memory device in which data is stored and a memory controller which controls the memory device to store and retrieve data in and from the memory device. Such memory devices are classified into a volatile memory device and a nonvolatile memory device.

The volatile memory device can retain data only when power is supplied and lose data when the supply of power is interrupted. Examples of the volatile memory device include a static random access memory (SRAM) and a dynamic random access memory (DRAM).

The nonvolatile memory device can retain data even when the supply of power is interrupted. Examples of the nonvolatile memory device include a read only memory (ROM), a programmable ROM (PROM), an electrically programmable ROM (EPROM), an electrically erasable and programmable ROM (EEPROM), and a flash memory.

SUMMARY

Various embodiments of the disclosure relate to a storage device having improved write performance and a method of operating the storage device.

An embodiment of the present disclosure may provide for a memory controller for controlling a plurality of memory devices. The memory controller may include a command processor configured to generate a flush command in response to a flush request from a host and determine flush data chunks to be stored in response to the flush command, among pieces of write data stored in a buffer, a write operation controller configured to control the plurality of memory devices to perform a first program operation of storing the flush data chunks, and to perform a second program operation of storing data corresponding to a write request that is input later than the flush request, regardless of whether a response to the flush command has been provided to the host, and a flush response controller configured to, when the first program operation is completed, provide a response to the flush command to the host depending on whether responses to flush commands that were input earlier than the flush command have been provided to the host.

An embodiment of the present disclosure may provide for a method of operating a memory controller for controlling a plurality of memory devices. The method may include generating a flush command in response to a flush request from a host and determining flush data chunks to be stored in response to the flush command, among pieces of write data stored in a buffer, controlling the plurality of memory devices to perform a first program operation of storing the flush data chunks, and when the first program operation is completed, providing a response to the flush command to the host depending on whether responses to flush commands that were input earlier than the flush command have been provided to the host.

BRIEF DESCRIPTION OF THE DRAWINGS

FIG. 4 is a diagram illustrating an example of a command information storage of FIG. 3.

FIG. 5 is a diagram illustrating an example of a flush information storage of FIG. 3.

FIGS. 6A and 6B are diagrams for explaining program operations of a plurality of memory devices performed to store flush data chunks using an interleaving scheme based on an embodiment of the disclosure.

FIG. 7 is a flowchart illustrating an example operation of a memory controller based on an embodiment of the disclosure.

DETAILED DESCRIPTION

The technology disclosed in this patent document can be implemented in embodiments to provide a memory controller configured to control a memory device.

Detailed description of functions and structures well known to those skilled in the art will be omitted to avoid obscuring the subject matter of the present disclosure. This aims to omit unnecessary description so as to make the subject matter of the present disclosure clear.

Various embodiments of the present disclosure will now be described more fully hereinafter with reference to the accompanying drawings, in which preferred embodiments of the present disclosure are illustrated, so that those of ordinary skill in the art can easily carry out the technical idea of the present disclosure.

Figure 1:
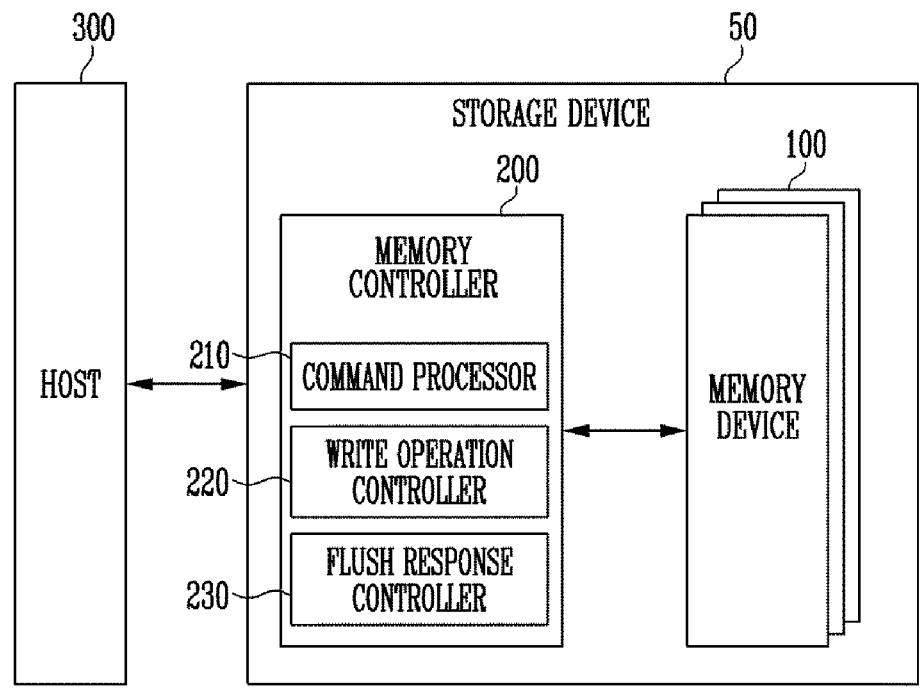
FIG. 1 is a diagram illustrating an example of a storage device based on an embodiment of the disclosure.

FIG. 1 is a diagram illustrating an example of a storage device based on an embodiment of the disclosure.

Referring to FIG. 1, a storage device 50 may include a memory device 100 and a memory controller 200. The storage device 50 may store data under the control of a host 300, such as a mobile phone, a smartphone, an MP3 player, a laptop computer, a desktop computer, a game console, a television (TV), a tablet personal computer (PC), or an in-vehicle infotainment system.

The storage device 50 may be manufactured as any one of various types of storage devices depending on a host interface, which is a communication interface between the host 300 and its peripheral devices. The storage device 50 may be implemented as any one of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may be a storage space where data to be processed and/or instructions to be executed are stored, and the memory controller 200 may include the logic needed to read and write to the memory device 100. The memory device 100 may include a memory cell array including a plurality of memory cells to store data therein.

Each of the memory cells may be implemented as a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells. A single memory block may include a plurality of pages. In an embodiment of the disclosure, read and program (write) operations are performed on a page basis, and erase operations are performed on a block basis and erase operations are performed on a memory block basis. In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In some embodiments of the disclosure, the memory device 100 may be a NAND flash memory.

The memory device 100 may allow the memory controller 200 to access the area of the memory cell array based on receive command and address signals generated by the memory controller 200. The memory device 100 may perform an operation corresponding to the command on the area selected by the address. For example, the memory device 100 may perform a write operation (i.e., program operation), a read operation, and an erase operation. During a program operation, the memory device 100 may write data to the area selected by the address. During a read operation, the memory device 100 may read data from the area selected by the address. During an erase operation, the memory device 100 may erase data stored in the area selected by the address.

The memory controller 200 controls the overall operation of the storage device 50.

When power is applied to the storage device 50, the memory controller 200 may run firmware (FW). When the memory device 100 is a flash memory device, the memory controller 200 may run firmware for controlling communication between the host 300 and the memory device 100. In an implementation where the memory devices 100 include flash memory devices (e.g., SSDs, USB flash drives, SD/MMC cards and eMMC chips), a flash translation layer (FTL) may be situated in the memory controller 200 to implement logical-to-physical mapping, garbage collection, wear leveling management, and bad block management, for example. As an example, the FTL may provide an interface between a host interface layer and a flash interface layer.

In an embodiment, upon receipt of a logical block address (LBA) from the host 300, the memory controller 200 may translate the logical block address into a physical block address (PBA) where actual memory cells to write data to or read data from are located in the memory device 100.

The memory controller 200 may control the memory device 100 so that various operations such as program, read, erase can be performed based on a request received from the host 300. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate a program command, an address, and data regardless of a request from the host 300, and may transmit them to the memory device 100. For example, the memory controller 200 may provide commands, addresses, and data to the memory device 100 to perform background operations, such as a program operation for wear leveling and a program operation for garbage collection.

In an embodiment, the memory controller 200 may control more than one memory device 100. In this case, the memory controller 200 may utilize an interleaving scheme in controlling the memory devices 100 to improve operating performance. The interleaving scheme may improve system performance by performing more than one operation at a given time frame. For example, the interleaving scheme may perform operations on two or more memory devices 100 at the same time by interleaving a part of a queue associated with a memory device with a part of another queue associated with another memory device.

In an embodiment, the memory controller 200 may include a command processor 210, a write operation controller 220, and a flush response controller 230.

The command processor 210 may include any type of logic circuitry that can generate command signals to execute various operating commands on the memory devices 100. For example, upon issuance of commands from user or host, the command processor 210 may generate command signals to the memory devices 100, and in turn the memory device 100 perform requested operations such as write/read/erase. For a "write" operation, the command processor 210 may utilize buffers to temporarily store the data to be written ("write data") to the memory devices 100. For example, upon receipt of a write request and data to be written, the command processor 210 may first store the data in a buffer (not shown). The size of the buffer needed to store the write data may vary depending on the size of data associated with the write request. The buffer may include any type of memory used as temporary storage of data. In an implementation, the buffer may include a cache memory implemented in a storage device. In another implementation, the buffer may include any type of buffer circuitry implemented in the memory controller 200 and/or the memory devices 100.

The command processor 210 may generate a flush command in response to a flush request from the host 300. In some implementations, the flush request may include any type of instruction for flushing "dirty" buffers so that the corresponding buffers can become available for the next write or read operations. For example, responsive to a flush command, the memory controller 200 may cause write data to be provided from a non-persistent storage (e.g., the buffer) to a persistent storage area (e.g., the memory devices 100). In some implementations, the user or host can decide when to flush or move the data from the buffer to the memory devices 100. In some other implementations, firmware in the memory controller 200 may decide when to flush or move the data from the buffer to the memory devices 100. The command processor 210 may provide the generated flush command both to the write operation controller 220 and to the flush response controller 230. In some implementations, the flush request may cause the data stored in the buffer, which is corresponding to write requests that are input earlier than the flush request, to be stored in the memory devices 100.

The command processor 210 may determine flush data chunks to be written to the memory devices 100 based on the flush command. Based on the flush command, the write data stored in the buffer is written to the memory devices 100. In an implementation, the command processor 210 may divide the write data stored in the buffer into flush data chunks having a preset size.

The write operation controller 220 may control the plurality of memory devices 100 to write the flush data chunks to the memory devices 100. Upon receipt of a write request that is issued later than the flush request, however, the write operation controller 220 may control the memory devices 100 to write data corresponding to the write request, regardless of whether a response to the flush command has been provided to the host.

In an embodiment, the write operation controller 220 may control the plurality of memory devices 100 so that the memory devices 100 write the flush data chunks and data corresponding to the write request, which is input later than the flush request, to the memory devices 100 using an interleaving scheme. In an embodiment of the disclosure, the write operation controller 220 may sequentially allocate the flush data chunks to the plurality of memory devices 100. After the flush data chunks have been allocated to the plurality of memory devices 100, the write operation controller 220 may allocate data, corresponding to the write request input later than the flush request, to the plurality of memory devices 100. Each of the memory devices 100 may perform a program operation to write flush data chunks to the allocated memory devices 100.

Upon completion of all of the program operations for flush data chunks, the write operation controller 220 may generate an operation completion signal to indicate that the flush command has been executed. In an embodiment, the write operation controller 220 may determine whether all of program operations have been completed whenever a new flush request is input from the host. In another embodiment, the write operation controller 220 may check to see whether all the program operations for flush data chunks have been completed upon receipt of each flush request. For example, the write operation controller 220 may check to see whether all previously queued program operations for flush data chunks have been completed upon receipt of each flush request. In an embodiment, the write operation controller 220 may determine whether all program operations have been completed at preset intervals. The write operation controller 220 may provide the generated operation completion signal to the flush response controller 230.

When the operation corresponding to the flush command received from the command processor 210 has been completed, the flush response controller 230 may provide a response to the host 300 that has issued the flush command. In another implementation, the response may indicate that the flush command has been executed responsive to the flush command the host 300 has issued. The flush response controller 230 may determine, based on the operation completion signal provided by the write operation controller 220, whether the operation corresponding to the received flush command has been completed.

In an embodiment, whether the flush response controller 230 provides a response to the host may be determined depending on whether responses associated with prior flush commands issued earlier than the currently received flush command have been provided to the host. For example, the flush response controller 230 may provide the response to the host in case responses associated with prior flush commands issued earlier than the currently received flush command have been provided to the host, and the flush response controller 230 may not provide the response to the host in case responses associated with prior flush commands issued earlier than the currently received flush command have not been provided to the host.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
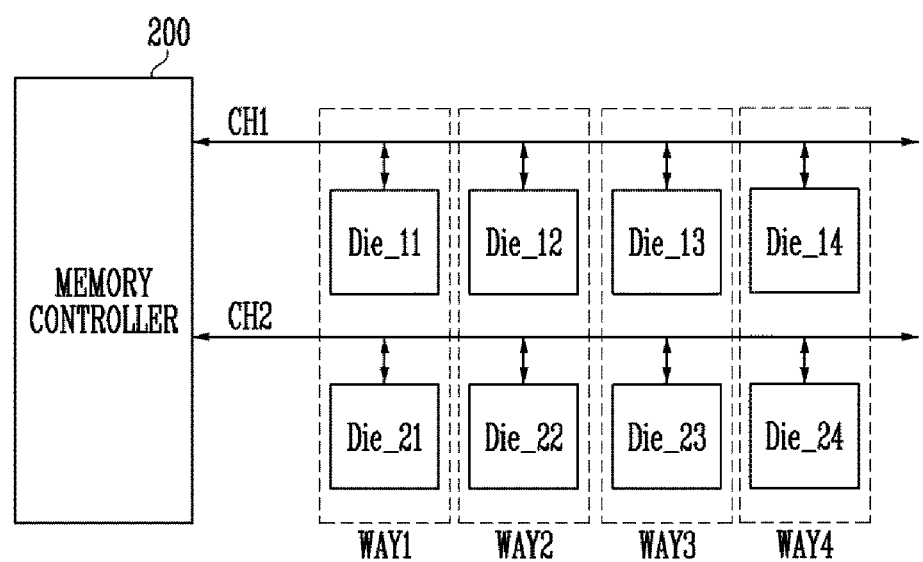
FIG. 2 is a diagram illustrating an example configuration of a memory controller of FIG. 1 and a plurality of memory devices.

FIG. 2 is a diagram illustrating an example configuration of the memory controller of FIG. 1 and a plurality of memory devices.

Referring to FIG. 2, the memory controller 200 may be coupled to a plurality of memory devices (e.g., memory device_11 to memory device_24) through a first channel CH1 and a second channel CH2. The number of channels or the number of memory devices coupled to each channel is not limited to what is illustrated in the drawing.

Memory device labeled with Die_11, memory device labeled with Die_12, memory device labeled with Die_13, and memory device labeled with Die_14 may be coupled in common to the first channel CH1. The memory device Die_11, the memory device Die_12, the memory device Die_13, and the memory device Die_14 may communicate with the memory controller 200 through the first channel CH1.

Since the memory device Die_11, the memory device Die_12, the memory device Die_13, and the memory device Die_14 may be coupled in common to the first channel CH1, only one memory device may communicate with the memory controller 200 at a time. However, the memory device Die_11, the memory device Die_12, the memory device Die_13, and the memory device Die_14 may simultaneously perform their own internal operations.

Memory device labeled with Die_21, memory device labeled with Die_22, memory device labeled with Die_23, and memory device labeled with Die_24 may be coupled in common to the second channel CH2. The memory device Die_21, the memory device Die_22, the memory device Die_23, and the memory device Die_24 may communicate with the memory controller 200 through the second channel CH2.

Since the memory device Die_21, the memory device Die_22, the memory device Die_23, and the memory device Die_24 may be coupled in common to the second channel CH2, only one memory device may communicate with the memory controller 200 at a time. However, the memory device Die_21, the memory device Die_22, the memory device Die_23, and the memory device Die_24 may simultaneously perform their own internal operations.

The storage device including a plurality of memory devices may improve performance using interleaving techniques such as data communication techniques that transmit data over a communication channel in a interleaved manner. For example, suppose each memory device or each memory array in the memory devices has its own data transmission route (e.g., "way") and a plurality of data transmission routes shares a common communication channel (e.g., "channel"). In this case, data interleaving may be implemented to perform a data read or write operation such that the communication channel communicates with one of the plurality of data transmission routes at a time while the plurality of data transmission routes communicates with the corresponding memory device simultaneously. In order to maximize parallelism of memory devices coupled to each channel, the memory controller 200 may distribute and allocate consecutive logical memory areas to channels and ways.

For example, the memory controller 200 may transmit control signals (e.g., a command and an address) and data to the memory device Die_11 through the first channel CH1. While performing a program operation on the memory device Die_11, the memory controller 200 may transmit the control signals (e.g., the command and the address) and the data to the memory device Die_12.

In FIG. 2, the plurality of memory devices may be grouped into four ways WAY1 to WAY4. The first way WAY1 may include the memory device Die_11 and the memory device Die_21. The second way WAY2 may include the memory device Die_12 and the memory device Die_22. The third way WAY3 may include the memory device Die_13 and the memory device Die_23. The fourth way WAY4 may include the memory device Die_14 and the memory device Die_24.

Each of the channels CH1 and CH2 may include a bus for signal transmission, which is shared and used by memory devices coupled to the corresponding channel.

Although, in FIG. 2, data interleaving in a 2-channel/4-way structure is illustrated, the number of channels and the number of ways may vary depending on various implementations.

Figure 3:
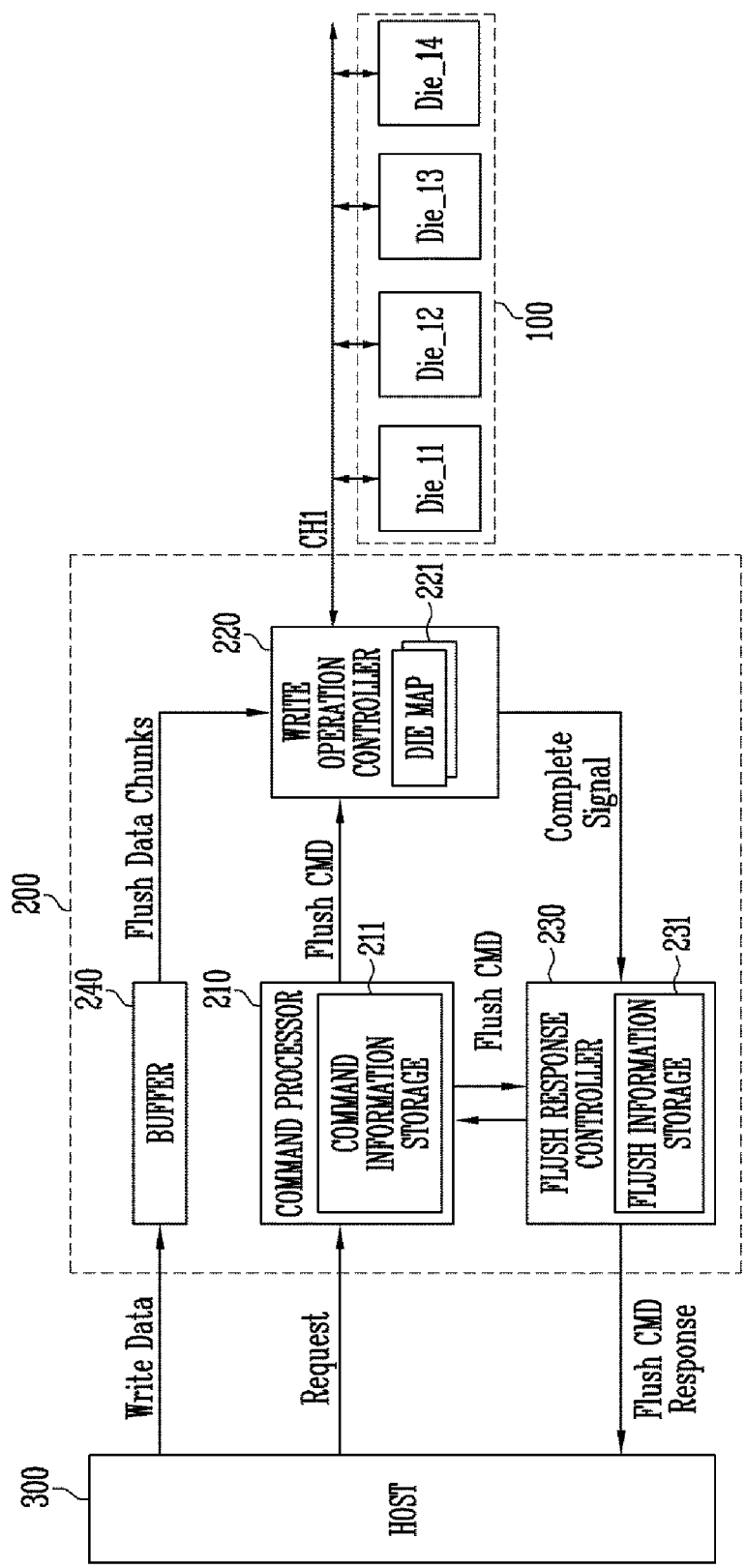
FIG. 3 is a diagram illustrating an example configuration of a memory controller based on an embodiment of the disclosure.

FIG. 3 is a diagram illustrating an example configuration of a memory controller based on an embodiment of the disclosure.

Referring to FIG. 3, the memory controller 200 may include a command processor 210, a write operation controller 220, a flush response controller 230, and a buffer 240.

In an embodiment, the command processor 210 may include a command information storage 211.

The command processor 210 may generate write commands based on a request received from a host 300. The command processor 210 may sequentially store the generated write commands in the command information storage 211. The command processor 210 may also generate flush commands based on the request received from a host 300. The command processor 210 may provide generated flush commands Flush CMD both to the write operation controller 220 and the flush response controller 230.

The command processor 210 may generate flush commands Flush CMD based on a flush request received from the host 300. The command processor 210 may sequentially store the generated flush commands Flush CMD in the command information storage 211. Upon issuance of such a flush command Flush CMD, the write data stored in the buffer 240 is written to the memory devices 100. The write data may be data corresponding to write commands stored earlier than the flush command Flush CMD, among commands stored in the command information storage 211.

The command processor 210 may determine flush data chunks to be stored in response to the flush command Flush CMD. In an implementation, the command processor 210 may divide the write data to be stored in response to the flush command Flush CMD into flush data chunks having a preset size.

In an embodiment, the write operation controller 220 may be coupled to a first channel CH1 coupled in common to a plurality of memory devices Die_11 to Die_14, described above with reference to FIG. 2. The number of channels coupled to the write operation controller 220 or the number of memory devices coupled to each channel is not limited to what is illustrated in the drawing.

When the flush command Flush CMD is received from the command processor 210, the write operation controller 220 may write flush data chunks corresponding to the flush command Flush CMD to the memory devices 100.

In an implementation, the write operation controller 220 may control the plurality of memory devices 100 to write the flush data chunks to the memory devices 100. Upon receipt of a write request that is issued later than the flush request, however, the write operation controller 220 may use a data interleaving scheme in controlling the memory devices 100 to write the flush data chunks as described above with reference to FIG. 2.

For example, the write operation controller 220 may sequentially allocate the flush data chunks to the first to fourth memory devices Die_11 to Die_14. Each of the memory devices may perform the program operation to write flush data chunks to the allocated memory devices 100.

In an embodiment of the disclosure, the write operation controller 220 may include die maps 221 respectively corresponding to memory devices coupled in common to the write operation controller 220 through the channel. Each of the die maps 221 may include status information indicating whether programming operations for writing flush data chunks to the corresponding memory device 100 has been completed. For example, the write operation controller 220 may include the die maps 221 respectively corresponding to the first to fourth memory devices Die_11 to Die_14 coupled in common to the write operation controller 220 through the first channel CH1.

The write operation controller 220 may determine whether all of program operations for writing flush data chunks to the corresponding memory device 100 based on the corresponding flush command Flush CMD have been completed. In this case, the write operation controller 220 may determine, based on the die maps 221, whether program operations for flush data chunks have been completed for each flush command Flush CMD.

When all of the program operations for flush data have been completed, the write operation controller 220 may generate an operation completion signal (or a completion signal) for the corresponding flush command Flush CMD. The write operation controller 220 may provide the generated operation completion signal to the flush response controller 230.

In an embodiment, the flush response controller 230 may include a flush information storage 231. The flush response controller 230 may store information in the flush information storage 231. In an implementation, the information includes a lookup table listing the flush commands Flush CMD received from the command processor 210 and the status of program operations corresponding to the flush commands Flush CMD.

In an embodiment of the disclosure, the flush response controller 230 may sequentially store the flush commands Flush CMD received from the command processor 210 to the flush information storage 231. The flush information storage 231 may store flush information indicating whether an operation, corresponding to each of the flush commands Flush CMD sequentially stored in the flush information storage 231, has been completed. The status of each flush command Flush CMD included in the flush information may indicate whether or not the operation corresponding to each of the flush commands Flush CMD has been completed. For example, the status of the flush command Flush CMD may be either an operation completion indicating the operation corresponding to each of the flush commands Flush CMD has been completed or an operation incompletion indicating the operation corresponding to each of the flush commands Flush CMD remains incomplete.

When an operation completion signal for the flush command Flush CMD provided by the write operation controller 220 is received, the flush response controller 230 may change the status of the corresponding flush command Flush CMD from the operation incompletion to the operation completion.

When the status of the flush command Flush CMD is the operation completion, the flush response controller 230 may provide the host 300 with a response (e.g., Flush CMD Response) to the flush command Flush CMD. In an embodiment of the disclosure, the flush response controller 230 sends the response only upon completion of the operation corresponding to the corresponding flush command Flush CMD. For example, when the status of at least one of flush commands Flush CMD that have been issued and stored in the flush information storage 231 earlier than the currently issued flush command Flush CMD is an operation incompletion state, the flush response controller 230 does not send the response (e.g., Flush CMD Response) to the host 300.

After sending the response to the host 300, the flush response controller 230 may delete the corresponding flush command Flush CMD from the flush information storage 231.

The buffer 240 may store write data corresponding to a write request from the host 300. Here, the write data may be data that is received along with a write command/address generated based on the write request. The write data is written to the corresponding memory device, and the size of the write data may vary.

The write data stored in the buffer 240 may be flush data chunks having a preset size in response to the flush command Flush CMD. The flush data chunks may be sequentially allocated to and stored in the plurality of memory devices 100 under the control of the write operation controller 220.

FIG. 4 is a diagram illustrating an example of the command information storage of FIG. 3.

Referring to FIG. 4, the command information storage may store command information including (1) a command generated based on a request received from a host, and (2) data to be stored in case the command relates to program operations.

A write command Write CMD may be generated in response to a write request received from the host. Write data may be provided along with the write command Write CMD.

A flush command Flush CMD may be generated in response to a flush request received from the host. Based on the flush command Flush CMD, write data corresponding to a write command Write CMD generated earlier than the flush command Flush CMD is written to the corresponding memory device.

In an embodiment of the disclosure where the command information storage includes two flush commands and a write request therebetween, based on a later-generated flush command Flush CMD, the write data corresponding to write commands Write CMD generated earlier than the later-generated flush command Flush CMD is written to the corresponding memory device. Here, the write commands Write CMD is a write command that is generated later than an earlier-generated flush command Flush CMD of the two flush commands.

Based on the flush command Flush CMD, flush data chunks may be written to the memory device. The flush data chunks may be data chunks to be written to the memory device in response to the flush command Flush CMD. The write data to be written to the memory device in response to the flush command Flush CMD may be divided into flush data chunks having a preset size. The preset size may be the size of data that can be programmed to the memory device through a single program operation. For example, since the program operation is performed on a page basis, the preset size may be the size of data stored in a single page.

For example, a write request is received from the host. This request is referred to as a first write request (Write Request 1). A first write command (Write CMD 1) may be generated based on the first write request (Write Request 1). First write data (Write Data 1) corresponding to the first write command (Write CMD 1) may be stored in a buffer, described above with reference to FIG. 3.

Subsequently, another write request is received from the host. This request is referred to as a second write request (Write Request 2). A second write command (Write CMD 2) may be generated based on the second write request (Write Request 2). Second write data (Write Data 2) corresponding to the second write command (Write CMD 2) may be stored in the buffer.

Subsequently, a flush request is received from the host. This request is referred to as a first flush request (Flush Request 1). A first flush command (Flush CMD 1) may be generated based on the first flush request (Flush Request 1). Based on the first flush command (Flush CMD 1), first and second write data (Write Data 1 and 2) corresponding to the first and second write commands (Write CMD 1 and 2), respectively, that are generated earlier than the first flush command (Flush CMD 1) may be written to the corresponding memory devices, described above with reference to FIG. 1.

In FIG. 4, assuming that the size of the first write data (Write Data 1) is 12 KB and the size of the second write data (Write Data 2) is 36 KB, the total size of write data (Write Data 1 and 2) to be stored in response to the first flush command (Flush CMD 1) may be 48 KB. The first and second write data (Write Data 1 and 2) may be divided into flush data chunks having a preset size. Assuming that the size of data stored in a single page is 8 kB, the preset size may be 8 KB. Therefore, the write data (Write Data 1 and 2) to be stored in response to the first flush command (Flush CMD 1) may be divided into first to sixth flush data chunks (i.e., Flush Data Chunk 1 to Flush Data Chunk 6).

Subsequently, another write request is received from the host. This request is referred to as a third write request (Write Request 3). A third write command (Write CMD 3) may be generated based on the third write request (Write Request 3). Third write data (Write Data 3) corresponding to the third write command (Write CMD 3) may be stored in the buffer.

Subsequently, another flush request is received from the host. This request is referred to as a second flush request (Flush Request 2). A second flush command (Flush CMD 2) may be generated based on the second flush request (Flush Request 2). Of the two flush commands (Flush CMD 1 and 2), the second flush command (Flush CMD 2) may cause the third write data (Write Data 3) corresponding to the third write command (Write CMD 3) to be written to the memory device. The third write command (Write CMD 3) may be a command that is generated earlier than the second flush command (Flush CMD 2) and is generated later than the first flush command (Flush CMD 1).

In FIG. 4, assuming that the size of the third write data (Write Data 3) is 16 KB, the size of the third write data (Write Data 3) to be stored in response to the second flush command (Flush CMD 2) may be 16 KB. Therefore, the third write data (Write Data 3) to be stored in response to the second flush command (Flush CMD 2) may be divided into first and second flush data chunks (i.e., Flush Data Chunks 1 and 2).

In FIG. 4, the size of the write data and the preset size of the flush data chunks are not limited to what is illustrated in the drawing.

In some implementations, data corresponding to a write request issued after the flush request is not written to the memory device until a response to a flush command generated based on a flush request is provided to the host.

For example, until a response to the first flush command (Flush CMD 1) is provided to the host, a program operation is not performed to write the third write data (Write Data 3) corresponding to the third write request (Write Request 3) to the memory device. Here, the third write request (Write Request 3) may be a request issued by the host after the first flush request (Flush Request 1).

In this scenario, only after the response to the first flush command (Flush CMD 1) is provided to the host, the program operation may be performed to write the third write data (Write Data 3) corresponding to the third write request (Write Request 3) to the memory device.

In an embodiment of the disclosure, however, the program operation can be performed to write, to the memory device, data corresponding to a write request issued later than a flush request from the host, even before the response to the flush command is provided to the host. The data corresponding to the write request may be written to the memory device regardless of whether a response to the flush command corresponding to the flush request received from the host has been provided to the host.

For example, regardless of whether the response to the first flush command (Flush CMD 1) has been provided to the host, the program operation is performed to write third write data (Write Data 3) corresponding to the third write request (Write Request 3) to the memory device. As such, the interleaving scheme can still work even if the response to the flush command has not been provided to the host.

Therefore, the program operations may write the first and second write data (Write Data 1 and 2) and the third write data (Write Data 3) to memory devices in an interleaved manner. Here, the first and second write data (Write Data 1 and 2) may be pieces of data to be stored in response to the first flush command (Flush CMD 1), and the third write data (Write Data 3) may be data corresponding to the third write request (Write Request 3).

FIG. 5 is a diagram illustrating an example of the flush information storage of FIG. 3.

Referring to FIG. 5, the flush information storage may retain flush information indicating whether an operation corresponding to each of flush commands (Flush CMD) has been completed. In an implementation, the flush information may be sequentially stored in the flush information storage.

A default value for the status of each flush command included in the flush information is "incomplete," which indicates an operation remains incomplete. When all program operations associated with flush data chunks corresponding to the flush command (Flush CMD) have been completed, the status of the flash command (Flush CMD) may be changed from "incomplete" to "complete," which indicates that the operations is now complete.

When the status of the flush command (Flush CMD) indicates an operation is complete, the response to the Flush CMD may be provided to the host. However, when the status of the flush command that is stored in the flush information storage earlier than the flush command (Flush CMD) indicates an operation remain incomplete, the response to the corresponding flush command (Flush CMD) cannot be provided to the host.

In FIG. 5, the status of a first flush command (Flush CMD 1) may be an operation incomplete state. The status of a second flush command (Flush CMD2) may be an operation complete state. The first flush command (Flush CMD 1) may be a command stored in the flush information storage earlier than the second flush command (Flush CMD 2).

The status of the second flush command (Flush CMD 2) is an operation complete state, but the status of the first flush command (Flush CMD 1) is an operation incomplete state, and thus a response to the second flush command (Flush CMD 2) may not be provided to the host, described above with reference to FIG. 1. The response to the second flush command (Flush CMD2) may be provided to the host when the status of the first flush command (Flush CMD 1) is changed to an operation complete state.

FIGS. 6A and 6B are diagrams for explaining program operations of a plurality of memory devices performed to store flush data chunks using an interleaving scheme based on an embodiment of the disclosure.

Referring to FIG. 6A, the write operation controller 220 may be coupled to a first channel CH1 coupled in common to first to fourth memory devices Die_11 to Die_14, described above with reference to FIG. 2. The number of channels coupled to the write operation controller 220 or the number of memory devices coupled to each channel is not limited to what is illustrated in the drawing.

The write operation controller 220 may control the first to fourth memory devices Die_11 to Die_14 to program the flush data chunks in an interleaved manner, described above with reference to FIG. 2. That is, the write operation controller 220 may sequentially allocate the flush data chunks to be programmed to the plurality of memory devices Die_11 to Die_14.

Each of the first to fourth memory devices Die_11 to Die_14 may individually perform program operations to write flush data chunks to the corresponding memory device. Therefore, a point in time at which the program operation for flush data chunks is completed may vary depending on different memory device.

In FIGS. 6A and 6B, the write operation controller 220 may sequentially allocate the first to fourth flush data chunks (Flush Data Chunk 1 to Flush Data Chunk 4) corresponding to the first flush command (Flush CMD 1) to the first to fourth memory devices Die_11 to Die_14, respectively, so that the first to fourth flush data chunks are written to the first to fourth memory devices Die_11 to Die_14.

Thereafter, the write operation controller 220 may sequentially allocate fifth and sixth flush data chunks (Flush Data Chunks 5 and 6) corresponding to the first flush command (Flush CMD 1) to the first and second memory devices Die_11 and Die_12, respectively, so that the fifth and sixth flush data chunks are written to the first and second memory devices Die_11 and Die_12.

Thereafter, the write operation controller 220 may sequentially allocate first and second flush data chunks (Flush Data Chunks 1 and 2) corresponding to the second flush command (Flush CMD 2) to the third and fourth memory devices Die_13 and Die_14, respectively, so that the first and second flush data chunks are written to the third and fourth memory devices Die_13 and Die_14.

When at least two flush data chunks are allocated to a single memory device, the single memory device may perform the program operation for the flush data chunks in the sequence of allocation thereof.

FIG. 6B illustrates die maps respectively corresponding to first to four memory devices Die_11 to Die_14. Each die map may include status information indicating whether programming of flush data chunks allocated to the corresponding memory device has been completed.

In FIG. 6B, it can be seen that, referring to the die map corresponding to the first memory device Die_11, first and fifth flush data chunks 1 and 5 (Flush Data Chunk 1 and 5) corresponding to the first flush command (Flush CMD 1) are allocated to the first memory device Die_11 so that the first and fifth flush data chunks are written to the first memory device Die_11. Here, the program operation for the first flush data chunk (Flush Data Chunk 1) is complete and thus the first flush data chunk (Flush Data Chunk 1) has been written to the first memory device Die_11. The program operation for the fifth flush data chunk (Flush Data Chunk 5) remains incomplete and thus the fifth flush data chunk has not been written to the first memory device Die_11 yet.

Referring to a die map corresponding to the second memory device Die_12, it can be seen that second and sixth flush data chunks (Flush Data Chunks 2 and 6) corresponding to the first flush command (Flush CMD 1) are allocated to the second memory device Die_12 so that the second and sixth flush data chunks are written to the second memory device Die_12. Here, the program operation for the second flush data chunk (Flush Data Chunk 2) is complete and thus the second flush data chunk (Flush Data Chunk 2) has been written to the second memory device Die_12. The program operation for the sixth flush data chunk (Flush Data Chunk 6) remains incomplete and thus the sixth flush data chunk has not been written to the second memory device Die_12 yet.

Referring to a die map corresponding to the third memory device Die_13, it can be seen that the third flush data chunk (Flush Data Chunk 3) corresponding to the first flush command (Flush CMD 1) is allocated to the third memory device Die_13 so that the third flush data chunk is written to the third memory device Die_13. Thereafter, it can be seen that the first flush data chunk (Flush Data Chunk 1) corresponding to the second flush command (Flush CMD 2) is allocated to be programmed. Here, the program operation for the third flush data chunk (Flush Data Chunk 3) is complete and thus the third flush data chunk has been written to the third memory device Die_13. The program operation for The first flush data chunk (Flush Data Chunk 1) is complete and thus the first flush data chunk has been written to the third memory device Die_13.

Referring to a die map corresponding to the fourth memory device Die_14, it can be seen that the fourth flush data chunk (Flush Data Chunk 4) corresponding to the first flush command (Flush CMD 1) is allocated to the fourth memory device Die_14 so that the fourth flush data chunk is written to the fourth memory device Die_14. Thereafter, it can be seen that the second flush data chunk (Flush Data Chunk 2) corresponding to the second flush command (Flush CMD 2) is allocated to be programmed. Here, the program operation for the fourth flush data chunk (Flush Data Chunk 4) is complete and thus the fourth flush data chunk has been written to the fourth memory device Die_14. The program operation for the second flush data chunk (Flush Data Chunk 2) is complete and thus the second flush data chunk has been written to the fourth memory device Die_14.

Consequently, the program operations for the first to fourth flush data chunks (Flush Data Chunk 1 to Flush Data Chunk 4), among flush data chunks corresponding to the first flush command (Flush CMD 1), are now complete. Among the flush data chunks corresponding to the first flush command (Flush CMD 1), the program operations for the fifth and sixth flush data chunks (Flush Data Chunk 5 and 6) remain incomplete.

Therefore, since program operations for some of flush data chunks corresponding to the first flush command (Flush CMD 1) remain incomplete, the operation for the first flush command (Flush CMD 1) remains incomplete.

In contrast, program operations for all of the flush data chunks (Flush Data Chunks 1 and 2) corresponding to the second flush command (Flush CMD 2) are complete.

Therefore, since all of flush data chunks corresponding to the second flush command (Flush CMD 2) have been written to the corresponding memory devices, it can be said that the operation for the second flush command (Flush CMD 2) is complete.

FIG. 7 is a flowchart illustrating an example operation of a memory controller based on an embodiment of the disclosure.

Referring to FIG. 7, at step S701, the memory controller may receive a flush request from a host.

At step S703, the memory controller may generate a flush command in response to the received flush request.

At step S705, the memory controller may program flush data chucks corresponding to the flush command to memory devices. In detail, the memory controller may control the memory devices so that the memory devices perform program operations to write flush data chunks to the memory devices using an interleaving scheme.

At step S707, when programming of all of flush data chunks has been completed, the memory controller may determine whether responses to flush commands that were input earlier than the received flush command have been provided to the host. When it is determined that the responses to the earlier-input flush commands have been provided to the host, the process proceeds to step S709, otherwise the process is terminated.

In an embodiment, whenever a new flush request is input from the host, the memory controller may determine whether a response to a flush command that was input earlier than the new flush request has been provided to the host. In other embodiments, the memory controller may determine, at intervals of a preset period, whether a response to an earlier-input flush command has been provided to the host.

At step S709, the memory controller may provide a response to the received flush command to the host. In an embodiment, the memory controller may store the received flush command. The memory controller may delete the flush command, to which a response has been provided, from the flush information storage.

Figure 8:
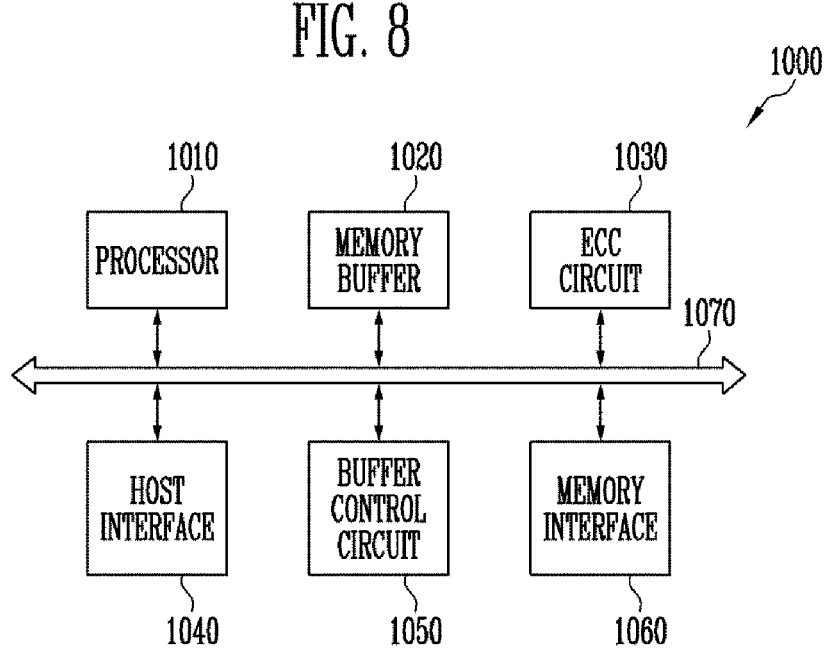
FIG. 8 is a diagram illustrating an example configuration of the memory controller of FIG. 1.

FIG. 8 is a diagram illustrating an example configuration of the memory controller of FIG. 1.

Referring to FIG. 8, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 9:
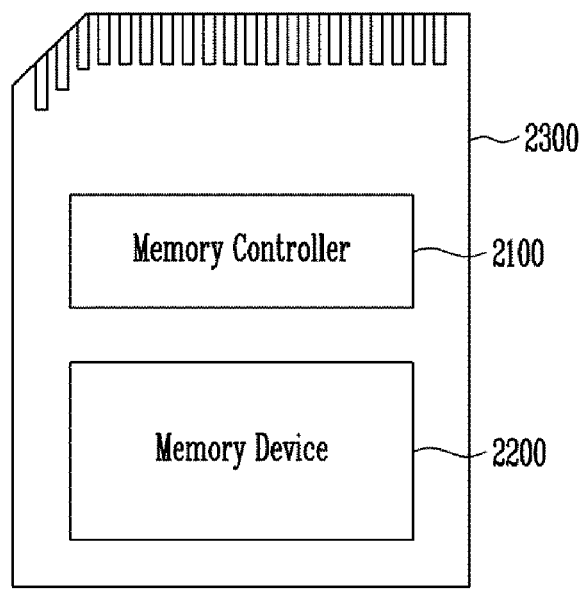
FIG. 9 is a block diagram illustrating a memory card system including a storage device implemented based on an embodiment of the disclosure.

FIG. 9 is a block diagram illustrating a memory card system including the storage device implemented based on an embodiment of the disclosure.

Referring to FIG. 9, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin-Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash (CF) card, a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 10:
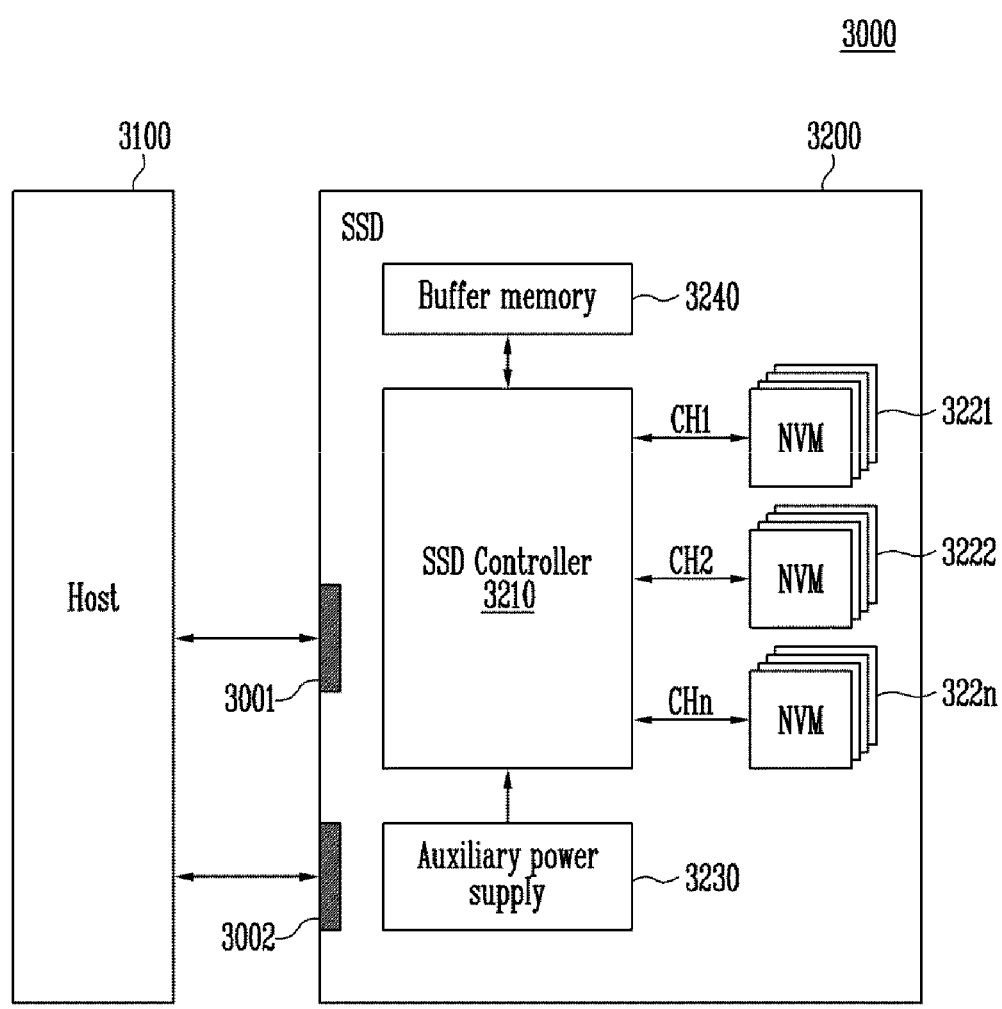
FIG. 10 is a block diagram illustrating a solid state drive (SSD) system including a storage device implemented based on an embodiment of the disclosure.

FIG. 10 is a block diagram illustrating a solid state drive (SSD) system including the storage device implemented based on an embodiment of the disclosure.

Referring to FIG. 10, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment of the disclosure, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 11:
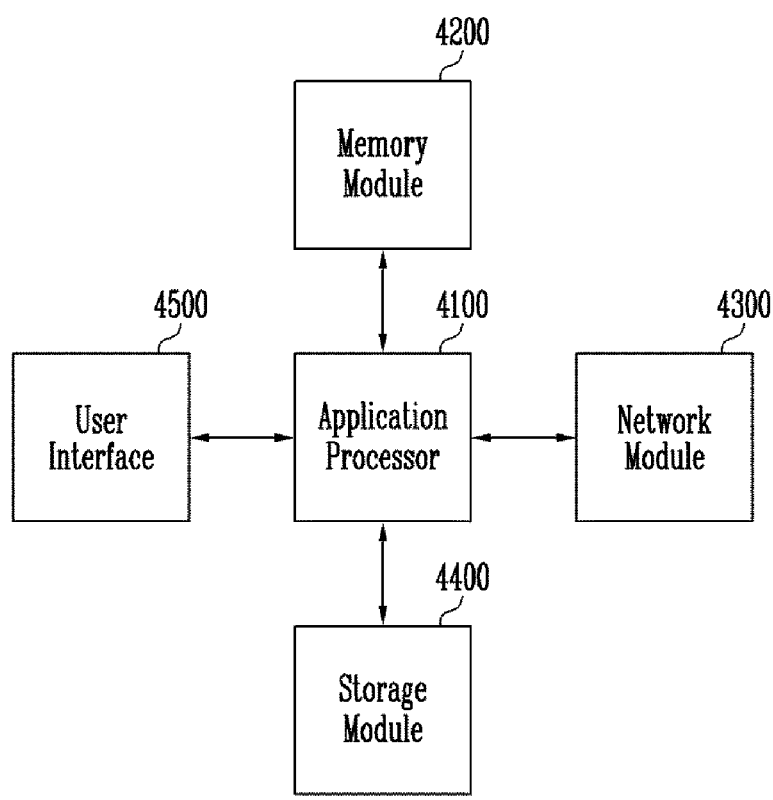
FIG. 11 is a block diagram illustrating a user system including a storage device implemented based on an embodiment of the disclosure.

FIG. 11 is a block diagram illustrating a user system including the storage device implemented based on an embodiment of the disclosure.

Referring to FIG. 11, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In some embodiments of the disclosure, there are provided a storage device having improved write performance and a method of operating the storage device.

The flush command causes data stored in a buffer to be written to a persistent storage area. In an interleaving scheme of a data storage including a plurality of memory devices, more than one operations can be performed simultaneously so long as different memory devices can use their common channel at different time frames. If the flush command is issued while a plurality of operations is being performed in an interleaved manner, however, already queued operations can be hindered due to the flush command. In some embodiments of the disclosure, however, command information and status information can be maintained so that already queued operations and the flush operations can be performed efficiently. Information associated with commands and their status can be used to decide whether the currently issued flush command should be executed immediately or should be delayed until previously queued operations are performed. Information associated with commands and their status can also be used to decide whether to send a response associated with the currently issued flush command. In some embodiments of the disclosure, a write operation controller is in communication with a command information storage and a flush information storage. The command information storage stores all the queued operations and the sequence of the queued operations. The flush information storage stores flush command information and status information of previously queued flush commands. In an implementation, the flush information storage includes a lookup table listing flush commands and the status of program operations corresponding to the flush commands.

In some embodiments of the disclosure, upon receipt of each flush request, a controller may check to see whether all previously queued program operations for flush data chunks have been completed. If at least one of previously queued flush commands is still pending (incomplete), a flush response controller does not send the response (e.g., Flush CMD Response) to the host. The flush response controller sends the response only upon completion of the operation corresponding to the previously queued flush commands. Write operations are performed such that a first program operation is performed to write the flush data chunks to the plurality of memory devices and a second program operation is performed for write data corresponding to a write request that is input later than the flush request, regardless of whether a response to the flush command has been provided to the host.

In an embodiment of the disclosure, a method of performing program operations on a plurality of memory devices, includes: receiving, from a host in communication with the plurality of memory devices, a flush request to write data in a buffer to one or more of the plurality of memory devices; looking up, from a flush information storage, previously queued flush commands and a status of the previously queued flush commands; and sending a response to the flush request upon determination that responses associated with previously queued flush commands have been provided to the host. The method further includes executing previously queued program commands regardless of whether a response to the currently received flush command has been provided to the host.

Only a few implementations and examples are described for the disclosure. Other implementations, enhancements and variations can be made based on what is described and illustrated in this patent document.

What is claimed is:

1. A memory controller for controlling a plurality of memory devices, comprising:
   a command processor configured to generate a flush command based on a flush request from a host and determine, among write data stored in a buffer, flush data chunks to be written to one or more of the plurality of memory devices based on the flush command;
   a write operation controller configured to control the plurality of memory devices to perform a first program operation to write the flush data chunks to the plurality of memory devices in response to the flush command while program operations for previously queued flush commands that are input earlier than the flush command are performed, and to provide commands for a second program operation to write data corresponding to a write request that is input later than the flush request, regardless of whether a response to the flush command has been provided to the host; and
   a flush response controller configured to, in response to an operation complete signal of the first program operation from the write operation controller, hold off on providing the response to the flush command to the host until responses to the previously queued flush commands are provided to the host, and to provide the response to the flush command to the host after the responses to the previously queued flush commands are provided to the host.

2. The memory controller according to claim 1, wherein the command processor comprises a command information storage configured to store flush command information and information about the flush data chunks.

3. The memory controller according to claim 2, wherein the command processor generates a write command corresponding to a write request received from the host and stores the write command in the command information storage.

4. The memory controller according to claim 1, wherein the command processor stores the write data in the buffer while the first program operation is being performed.

5. The memory controller according to claim 1, wherein the flush request is a request for writing, to the plurality of memory devices, data corresponding to a write command that is input earlier than the flush request.

6. The memory controller according to claim 1, wherein the write operation controller is configured to, when the first program operation is completed, generate the operation complete signal for the flush command and provide the operation complete signal to the flush response controller.

7. The memory controller according to claim 1, wherein the write operation controller controls the plurality of memory devices to perform the first program operation and the second program operation using an interleaving scheme.

8. The memory controller according to claim 7, wherein:
the write operation controller comprises die maps respectively corresponding to the plurality of memory devices; and
each of the die maps indicates whether programming of the flush data chunks allocated to a corresponding one of the memory devices has been completed.

9. The memory controller according to claim 8, wherein the write operation controller updates the die maps whenever a new flush request is input from the host.

10. The memory controller according to claim 1, wherein the flush response controller comprises a flush information storage configured to store flush information indicating whether operations corresponding to the flush command and the previously queued flush commands input earlier than the flush command have been completed.

11. The memory controller according to claim 10, wherein the flush response controller updates the flush information when the first program operation is completed.

12. The memory controller according to claim 10, wherein the flush response controller determines, based on the flush information, whether all of operations for the previously queued flush commands input earlier than the flush command have been completed, and provides the response to the flush command to the host based on a result of the determination.

13. The memory controller according to claim 10, wherein the flush response controller is configured to, when the response to the flush command is provided to the host, delete flush information related to the flush command from the flush information storage.

14. A method of operating a memory controller for controlling a plurality of memory devices, the method comprising:
generating a flush command based on a flush request from a host;
determining, among write data stored in a buffer, flush data chunks to be written to the plurality of memory devices based on the flush command;
controlling the plurality of memory devices to perform a first program operation to write the flush data chunks to the plurality of memory devices in response to the flush command while program operations for previously queued flush commands that are input earlier than the flush command are performed, and to provide commands for a second program operation to write data corresponding to a write request that is input later than the flush request, regardless of whether a response to the flush command has been provided to the host; and
in response to an operation complete signal of the first program operation, holding off on providing the response to the flush command to the host until responses to the previously queued flush commands are provided to the host, and to provide the response to the flush command to the host after the responses to the previously queued flush commands are provided to the host.

15. The method according to claim 14, wherein the memory controller controls the plurality of memory devices to perform the first program operation and the second program operation using an interleaving scheme.

16. The method according to claim 14, wherein the flush request is a request for writing, to the plurality of memory devices, data corresponding to a write command that is input earlier than the flush request, and wherein the method further comprises providing the response to the flush command to the host after the responses to the previously queued flush commands are provided to the host.

17. The method according to claim 14, further comprising checking whether the first program operation has been completed whenever a new flush request is input from the host, before providing the response to the flush command to the host.

18. A method of performing program operations on a plurality of memory devices, the method comprising:
generating a flush command based on receiving, from a host, a flush request and determining, among write data stored in a buffer, flush data chunks to be written to the plurality of memory devices based on the flush command;
controlling the plurality of memory devices to perform a first program operation to write the flush data chunks to the plurality of memory devices in response to the flush command while program operations for previously queued flush commands are performed, and to provide commands for a second program operation to write data corresponding to a write request that is input later than the flush request, regardless of whether a response to the flush command has been provided to the host;
looking up, from a flush information storage, the previously queued flush commands and a status of the previously queued flush commands;
in response to an operation complete signal of the first program operation, holding off on sending the response to the flush command to the host until responses to the previously queued flush commands are provided to the host; and
sending the response to the flush command to the host after the responses to the previously queued flush commands are provided to the host.

* * * * *